(No Model.)

W. S. MARSHALL.
SADDLE BAG.

No. 424,324. Patented Mar. 25, 1890.

Attest.
Victor J. Evans.
Chas. E. Hunt.

Inventor.
W. Scott Marshall
By T. McCleary

UNITED STATES PATENT OFFICE.

WINFIELD SCOTT MARSHALL, OF CENTRALIA, ILLINOIS.

SADDLE-BAG.

SPECIFICATION forming part of Letters Patent No. 424,324, dated March 25, 1890.

Application filed June 3, 1889. Serial No. 313,010. (No model.)

*To all whom it may concern:*

Be it known that I, WINFIELD SCOTT MARSHALL, of Centralia, in the county of Marion and State of Illinois, have invented certain new and useful Improvements in Combined Saddle-Bags and Hand-Cases; and I do hereby declare the following to be a full, clear, and exact description of the invention, such as will enable others skilled in the art to which it pertains to make and use the same.

My invention relates to an improvement in combined saddle-bags and hand-trunks, the primary object being to provide improved means for securing the sections of the trunk together and for disconnecting the sections when they are to be used as saddle-bags.

The invention consists in the features of construction hereinafter fully described, and pointed out in the claim.

Figure 1:
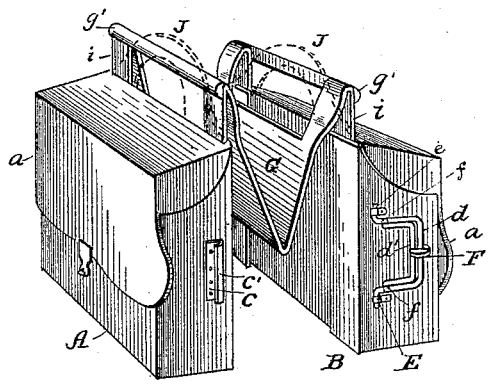
Figure 2:
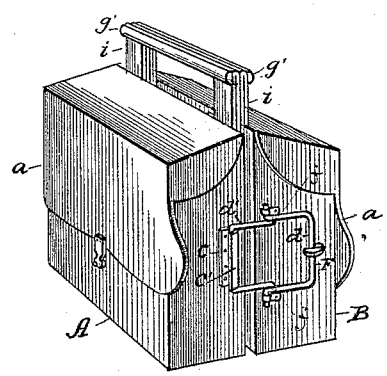
Figure 3:
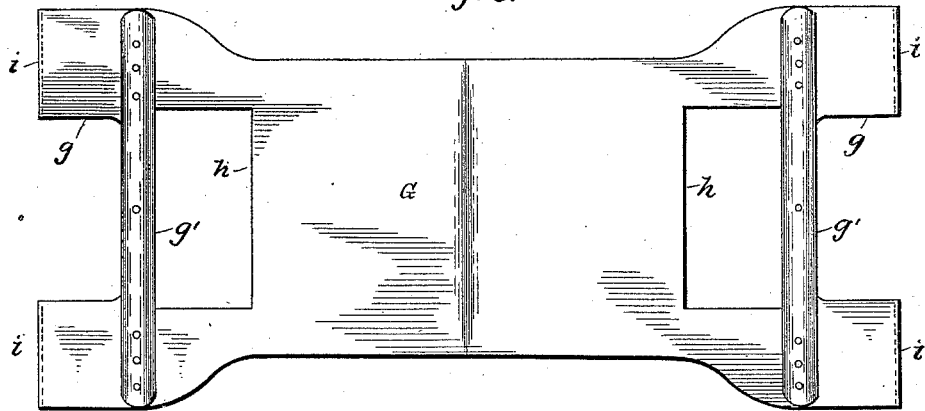

In the drawings, Figure 1 is a view in perspective of my invention, showing it arranged as saddle-bags. Fig. 2 is a similar view showing the device arranged as a hand-trunk. Fig. 3 represents the connecting-strap and handles.

A and B are two counterpart boxes or cases, each provided with a cover $a$. The interior of these cases may be arranged as desired to contain bottles, instruments, &c. To one end of the case A, at about midway its top and bottom, (and near the inner edge,) is secured a plate C, formed with a hook edge C' to receive one bail of the securing device. To the end of the box B is secured a hinged catch, consisting of an outer bail $d$ and an inner bail $d'$. The outer bail $d$ is provided with journals $e$, supported in bracket-bearings E, secured to the box B. The inner bail $d'$ fits within the outer bail $d$, and is pivotally secured thereto by pins $f$.

F represents a pivotal catch or hook adapted to be turned to embrace one or both of the bails $d$ and $d'$.

When the device is to be used as saddle-bags, both bails are turned back to rest upon the end of the box B, and the hook is turned to secure them, as seen in Fig. 1. When the boxes A and B are to be connected for use as a hand-trunk, the catch F is turned to release the bails. The inner bail is turned to engage the hook C', the outer bail is turned back upon the box B, and the catch F is turned to secure the outer bail, as seen in Fig. 2.

Referring to Fig. 3, G represents the connecting saddle-bag strap cut away at the points $g$ and $h$ and provided with handle-pieces $g'$ of wood or other rigid material. The ends $i$ of the strap are secured to the boxes, as shown in Fig. 1, so that the handle-pieces $g'$ are in position opposite each other to be grasped together. If preferred, extra handles J of leather may be secured by rivets or stitching to the boxes, as shown by dotted lines in Fig. 1.

It will be understood that both ends of the cases are provided with the securing-bails; but the respective locations of the hook-plate C and bails are reversed on the ends (not seen in the drawings)—that is to say, each box has a hook C' on one end and bails on its opposite end.

It will be apparent that the device thus described may be readily converted from a trunk into saddle-bags, and vice versa.

By the construction and relative arrangement of the bails $d$ and $d'$, the latter being pivoted within the former, I secure a drawing or pulling strain on the hook-plate C, (after the engagement of the bail $d'$ therewith,) when the bail $d$ is turned for engagement with the catch F.

I claim—

The combination, with the boxes, of end fastenings, each consisting of a hook-plate C, a bail $d$, pivotally secured to the box, a bail $d'$, pivotally secured to the bail $d$, and a catch F, substantially as set forth.

In testimony whereof I have signed this specification in the presence of two subscribing witnesses.

WINFIELD SCOTT MARSHALL.

Witnesses:
 EUG. S. STOKES,
 J. A. RILEY.